(12) United States Patent
Cocchi et al.

(10) Patent No.: US 8,297,182 B2
(45) Date of Patent: Oct. 30, 2012

(54) MACHINE FOR PRODUCING AND DISPENSING ICE CREAM SHOP PRODUCTS

(75) Inventors: Gino Cocchi, Bologna (IT); Gianni Zaniboni, Borgonuovo di Sasso Marconi (IT); Roberto Lazzarini, Reggio Emilia (IT)

(73) Assignee: Carpigiani Group-ALI S.p.A. (IT)

( * ) Notice: Subject to any disclaimer, the term of this patent is extended or adjusted under 35 U.S.C. 154(b) by 664 days.

(21) Appl. No.: 12/379,717

(22) Filed: Feb. 27, 2009

(65) Prior Publication Data

US 2009/0217825 A1   Sep. 3, 2009

(30) Foreign Application Priority Data

Feb. 29, 2008   (IT) .............................. BO2008A0137

(51) Int. Cl.
*A23C 3/04* (2006.01)
*F25C 5/02* (2006.01)
*F25C 1/00* (2006.01)
*B01F 3/04* (2006.01)
*A23G 9/00* (2006.01)

(52) U.S. Cl. .................. 99/455; 99/470; 62/71; 62/135; 62/233; 62/306; 62/342

(58) Field of Classification Search .............. 99/470; 62/71, 135, 233, 306, 342
See application file for complete search history.

(56) References Cited

U.S. PATENT DOCUMENTS

| | | | | |
|---|---|---|---|---|
| 1,449,623 A * | 3/1923 | Pfouts | ........................... | 366/143 |
| 2,515,722 A * | 7/1950 | Maranz | ........................... | 62/343 |
| 3,196,627 A * | 7/1965 | Swenson | ........................ | 62/136 |
| 3,641,783 A * | 2/1972 | Werner | ........................... | 62/343 |
| 3,698,206 A * | 10/1972 | Werner | .......................... | 62/342 |
| 3,724,235 A * | 4/1973 | Carpigiani | ...................... | 165/61 |
| 3,742,724 A * | 7/1973 | Carpigiani | ...................... | 62/331 |
| 3,811,494 A * | 5/1974 | Menzel | ............................ | 165/65 |
| 3,818,716 A * | 6/1974 | Carpigiani | ...................... | 62/178 |
| 3,858,498 A * | 1/1975 | Swenson | ........................ | 99/470 |
| 3,898,859 A * | 8/1975 | Duke | .............................. | 62/135 |
| 3,934,427 A * | 1/1976 | Keyes | ............................. | 62/342 |
| 3,989,492 A * | 11/1976 | Keyes | ............................. | 62/136 |
| 4,566,612 A * | 1/1986 | von Kreuter | .................. | 222/309 |
| 4,580,905 A * | 4/1986 | Schwitters et al. | ........... | 366/149 |
| 4,653,281 A * | 3/1987 | Van Der Veer | .................... | 62/71 |
| 4,758,143 A * | 7/1988 | Lopes | ............................. | 425/91 |
| 4,817,396 A * | 4/1989 | Menzel | ........................... | 62/306 |
| 5,170,344 A * | 12/1992 | Berton et al. | ................... | 700/90 |
| 5,400,614 A * | 3/1995 | Feola | ............................. | 62/233 |
| 5,433,084 A * | 7/1995 | Kaiser et al. | ................... | 62/306 |
| 5,494,194 A * | 2/1996 | Topper et al. | ............. | 222/146.6 |
| 5,553,756 A * | 9/1996 | Topper et al. | ................. | 222/496 |

(Continued)

FOREIGN PATENT DOCUMENTS

EP   1949794 A2 *   7/2008

(Continued)

*Primary Examiner* — Alvin Hunter

(74) *Attorney, Agent, or Firm* — Timothy J. Klima; Shuttleworth & Ingersoll, PLC

(57) ABSTRACT

A machine for producing ice cream shop products comprises a whipping and freezing unit (2) with a horizontal axis (A) and a removable head (10) forming an end wall (11) of the whipping and freezing unit (2), there being in the wall (11) an inlet (12) for ingredients intended to constitute the ice cream shop products, and an outlet (13) for the ice cream shop product prepared.

17 Claims, 8 Drawing Sheets

U.S. PATENT DOCUMENTS

| | | | | |
|---|---|---|---|---|
| 5,692,392 | A | * | 12/1997 | Swier .............................. 62/342 |
| 5,706,720 | A | * | 1/1998 | Goch et al. ...................... 99/455 |
| 5,775,533 | A | * | 7/1998 | Schroeder ....................... 222/95 |
| 5,934,516 | A | * | 8/1999 | Strycharske et al. ......... 222/158 |
| 6,145,701 | A | * | 11/2000 | Van Der Merwe et al. ..... 222/40 |
| 6,299,025 | B1 | * | 10/2001 | Watanabe et al. ........... 222/146.6 |
| 6,460,734 | B1 | * | 10/2002 | Schroeder et al. ......... 222/129.1 |
| 6,723,361 | B2 | * | 4/2004 | Feola ........................... 426/231 |
| 7,047,758 | B2 | * | 5/2006 | Ross ............................... 62/342 |
| 7,178,976 | B2 | * | 2/2007 | Gerber ....................... 366/177.1 |
| 7,354,192 | B2 | * | 4/2008 | Jejcic .......................... 366/347 |
| 7,621,669 | B1 | * | 11/2009 | Gerber ....................... 366/177.1 |

FOREIGN PATENT DOCUMENTS

| | | | |
|---|---|---|---|
| EP | 2095720 A2 | * | 9/2009 |
| JP | 61149051 A | * | 7/1986 |
| JP | 10327761 A | * | 12/1998 |
| WO | WO 2009/027757 A1 | * | 3/2009 |

* cited by examiner

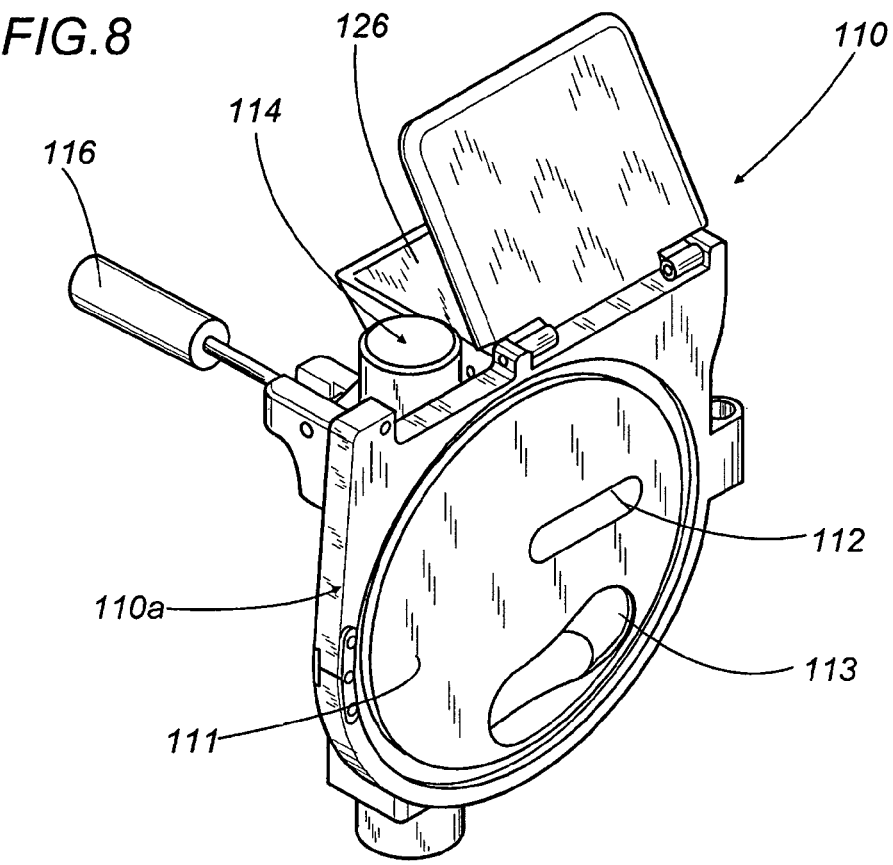
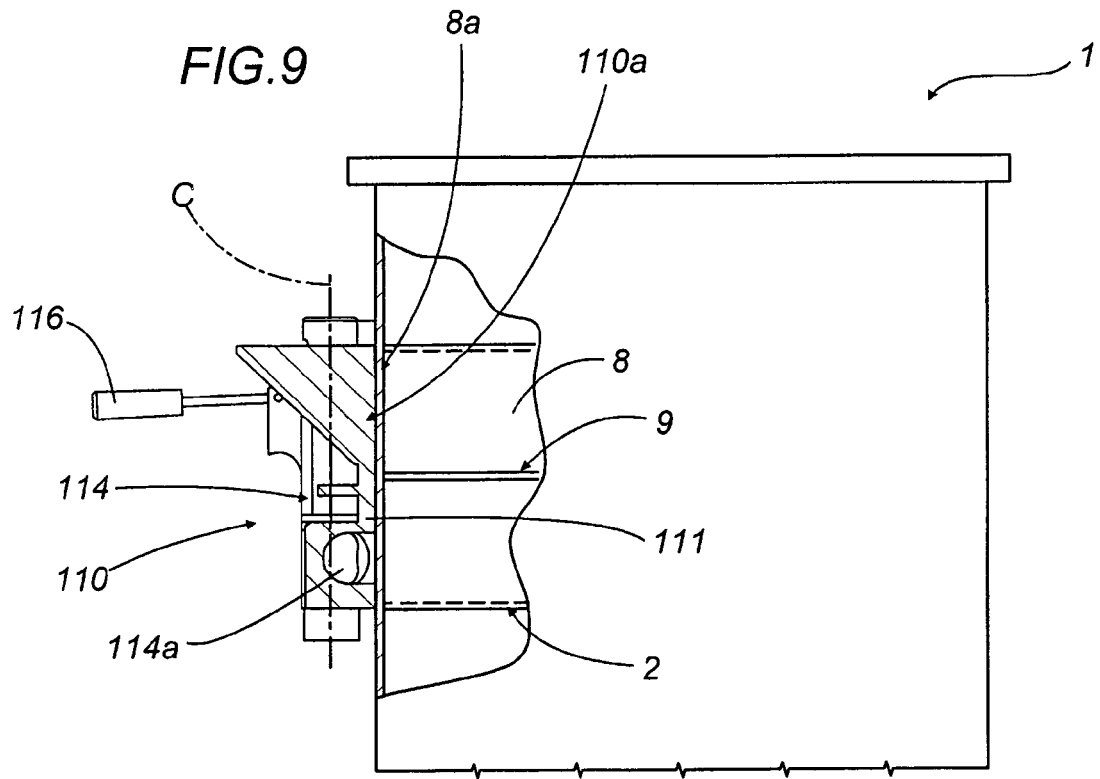

_US 8,297,182 B2_

MACHINE FOR PRODUCING AND DISPENSING ICE CREAM SHOP PRODUCTS

This application claims priority to Italian Patent Application No. BO2008A000137, filed Feb. 29, 2008, which application is incorporated by reference herein.

BACKGROUND OF THE INVENTION

The present invention relates to a machine for preparing and dispensing ice cream shop products.

More particularly, the present invention relates to a machine for preparing artisan ice creams and the like, of the type with a horizontal whipping and freezing unit.

As is known, a machine of this type comprises a substantially box-shaped frame housing a whipping and freezing chamber with a horizontal axis.

The whipping and freezing chamber, or whipping and freezing unit, is designed to mix, cool and blend together a plurality of ingredients to form a cream for ice cream, a crushed-ice drink or similar products.

The ingredients are inserted in the whipping and freezing chamber through a respective inlet in fluid communication with the whipping and freezing chamber.

The ice cream produced is made available through a respective whipping and freezing chamber outlet.

The outlet is usually fitted with a grille which facilitates detachment of the ice cream and prevents the mass coming out from agglomerating.

These machines are structured to pour the product directly into collecting tubs to be displayed in ice cream shop counters or to be preserved in a refrigerator.

There are prior art machines for producing ice cream which involve establishing an overpressure in the whipping and freezing chamber to improve the incorporation of air by the product being prepared.

These machines, referred to as pressurized, because of their structural and functional features, make it difficult to introduce solid bodies, such as cereals, pieces of fruit or dried fruits into the product being whipped and frozen.

Moreover, these solid bodies cannot be introduced at the same time as the whipping and freezing unit is initially filled, but instead must be introduced when the whipping and freezing process is at an advanced stage, that is to say, when the product being prepared has reached a predetermined consistency, as otherwise they would easily be exposed to impacts with the mixing means which would break them into pieces. However, in this case the pressurized whipping and freezing chamber would have to be opened, with obvious risks of unwanted discharges of material.

Therefore, the prior art machines are not without disadvantages, in particular as regards the preparation of ice creams comprising solid bodies such as cereals, pieces of fruit or dried fruits.

SUMMARY OF THE INVENTION

The aim of the present invention is therefore to provide a machine for preparing and dispensing ice cream shop products which is free of the disadvantages of the prior art machines and which at the same time is practical and simple to use for an operator.

Accordingly the invention achieves these aims with a machine for preparing and dispensing ice cream shop products, comprising the features described in one or more of the claims herein.

BRIEF DESCRIPTION OF THE DRAWINGS

The technical features of the invention, with reference to the above aims, are clearly described in the claims below, and its advantages are more apparent from the detailed description which follows, with reference to the accompanying drawings which illustrate a preferred embodiment of the invention provided merely by way of example without restricting the scope of the inventive concept, and in which:

FIG. 8 is a perspective rear view of the door of FIG. 6;

FIG. 9 is a schematic side elevation view with some parts transparent of a machine for producing and dispensing ice cream shop products made in accordance with the present invention on which the detail of FIG. 6 is mounted;

FIG. 10 is a front view of the door of FIG. 9a;

FIG. 11 is a side view of the door of FIG. 9a.

DESCRIPTION OF THE PREFERRED EMBODIMENTS

With reference to the accompanying drawings, the numeral 1 denotes as a whole a machine for producing and dispensing ice cream shop products in accordance with the present invention.

Figure 1:
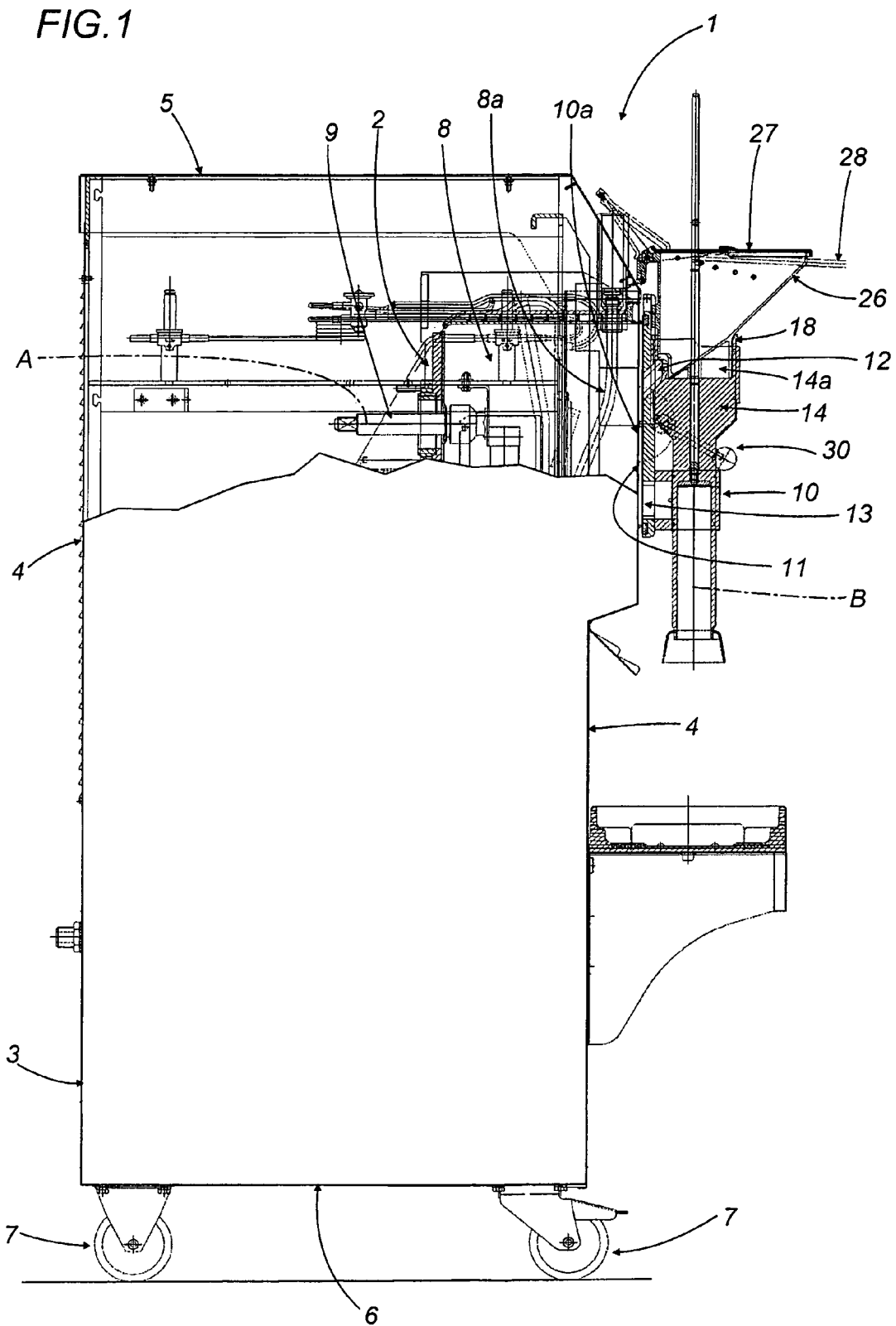
FIG. 1 is a schematic side elevation view with some parts transparent of a machine for producing and dispensing ice cream shop products made in accordance with the present invention.

In particular with reference to FIG. 1, the machine 1 is of the type comprising a horizontal whipping and freezing unit 2 and a supporting and containment frame 3 housing the whipping and freezing unit 2, a plurality of motor elements and control means for the whipping and freezing unit (of the known type and therefore not illustrated).

The frame 3 comprises four lateral walls 4, an upper wall 5 and a base 6.

Fixed on the base 6 there are four wheels 7, of which only two are visible in FIG. 1, for facilitating machine 1 movement.

The whipping and freezing unit 2 comprises a substantially cylindrical refrigerated chamber 8 having a substantially horizontal axis A of extension.

Inside the chamber 8 there is a motor-driven mixer 9, only part of which is illustrated in FIG. 1, for clarity. The mixer rotates about the horizontal axis A of extension of the chamber 8 and comprises a plurality of blades not illustrated. Rotation of the mixer 9, and therefore of the blades, mixes in the known way the ingredients introduced into the whipping and freezing unit and pushes the creamy mass of ice cream shop product being formed towards one end 8a of the whipping and freezing unit 2 chamber 8.

At the end 8a of the chamber 8, the machine 1 comprises a removable head 10 which, with its flat portion 10a, forms an end wall 11 of the refrigerated chamber 8 and therefore of the whipping and freezing unit 2.

In the end wall 11 formed by the portion 10a there is an inlet 12 for the ingredients to be inserted in the whipping and freezing unit 2 and intended to constitute the ice cream shop product, and an outlet 13 for the ice cream shop product prepared.

The inlet 12 and the outlet 13 are separate from each other and are positioned at different heights above the ground: the inlet 12 is in the higher position and the outlet 13 is in the lower position.

In accordance with the embodiment illustrated in FIGS. 1 to 4, the machine 1 also comprises a closing element 14 for the inlet 12 and the outlet 13.

Figure 4:
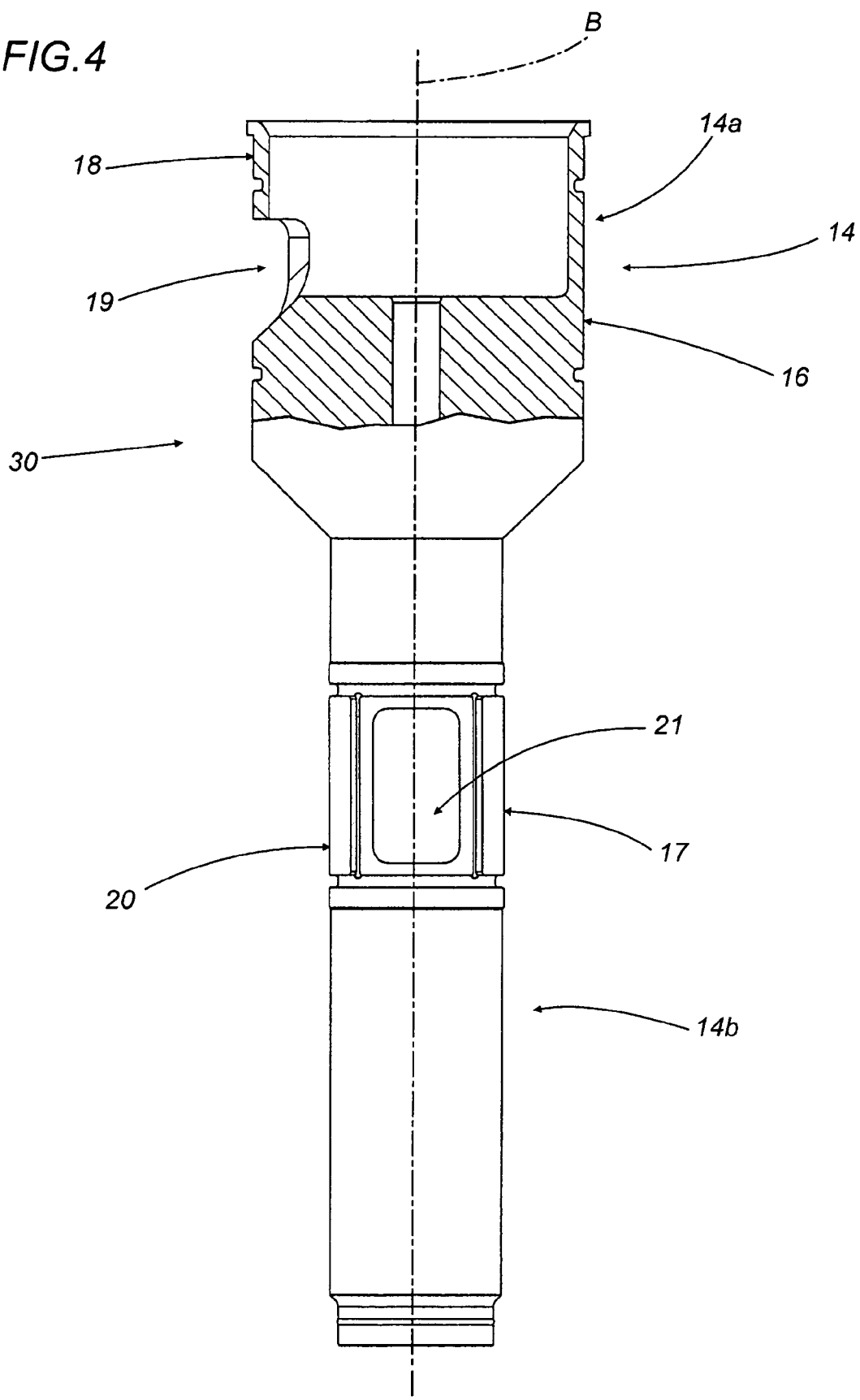
FIG. 4 is an enlarged, schematic view, partly in cross-section, of a detail of the machine of the previous figures.

As illustrated in FIG. 4, the closing element 14 comprises a first separator 16 designed to close the inlet 12 and a second separator 17 designed to close the outlet 13.

The closing element 14 comprises a cup-shaped upper portion 14a delimited at the side by an upper cylindrical wall 18, the wall 18 having a first opening 19.

The closing element 14 also comprises an open lower tubular portion 14b, delimited at the side by a lower cylindrical wall 20 having a second opening 21.

The upper cylindrical wall 18, with the exception of the first opening 19, forms the first separator 16 designed to close the inlet 12 to the whipping and freezing unit 2.

The lower cylindrical wall 20, with the exception of the second opening 21, forms the second separator 17 designed to close the outlet 13 from the whipping and freezing unit 2.

With reference to FIG. 4, considering the bundle of planes passing through the central axis B of the closing element 14, the first and second openings 19, 21 have respective planes of symmetry belonging to the bundle, the planes of symmetry being at right angles to each other, that is to say, offset by 90 sexagesimal degrees.

In particular, the plane of symmetry of the first, upper opening 19 substantially coincides with the plane of FIG. 4 whilst the plane of symmetry of the second, lower opening 21 is perpendicular to the plane of FIG. 4 and its line coincides, in FIG. 4, with the central axis B of the closing element 14.

Figure 2:
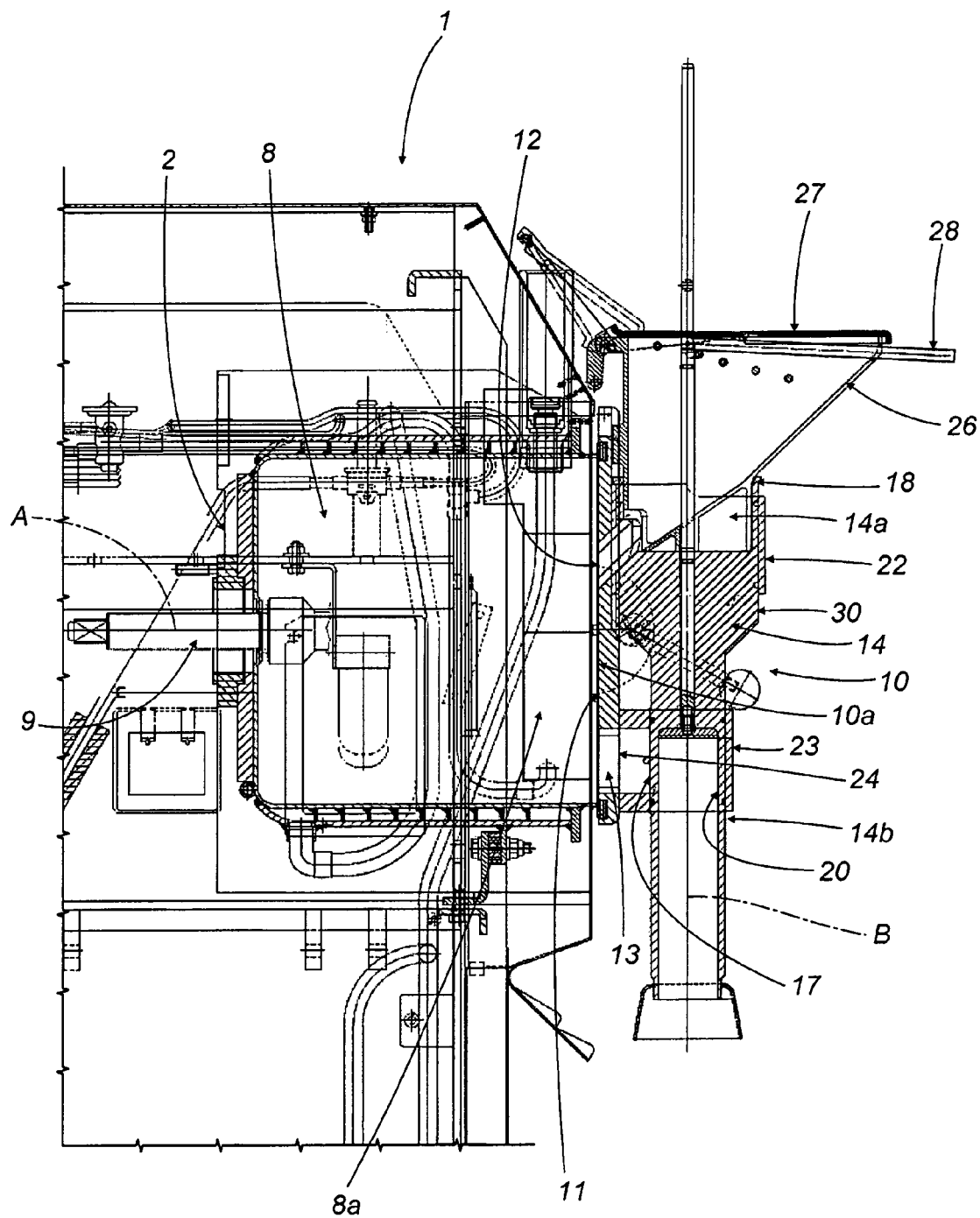
FIG. 2 is an enlarged detail of FIG. 1.

With reference to FIG. 2, the closing element 14 is rotatably supported by the head 10 by means of two annular supports 22, 23 designed to fit around the outside of, respectively, the upper cylindrical wall 18 and the lower cylindrical wall 20 of the closing element 14.

In particular, the lower annular support 23 is connected to the flat portion 10a through a tubular channel 24 designed to put into fluid connection the product outlet 13 and the second opening 21 in the closing element 14, thus allowing the ice cream shop product to exit through the lower tubular portion 14b.

Figure 3:
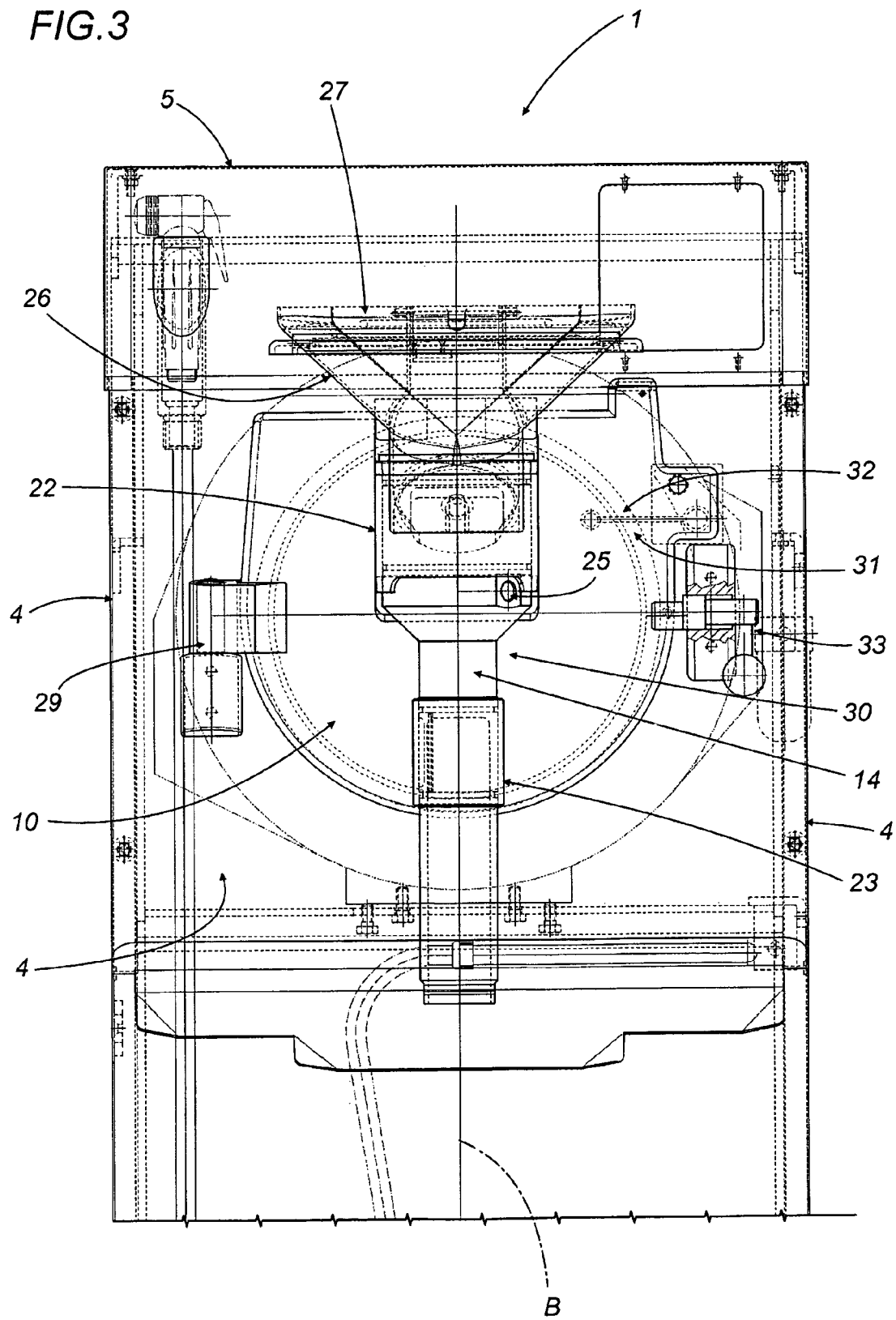
FIG. 3 is a schematic front elevation view of a portion of the machine of FIG. 1.

The machine 1 comprises a control handle for the closing element 14. The handle, not illustrated, is partly inserted in a respective housing 25, advantageously threaded. The housing 25, visible in FIG. 3, is made in the element 14, at an intermediate position between the upper cup-shaped portion 14a and the lower tubular portion 14b.

The control handle, not illustrated, extends radially relative to the central axis B of the element 14.

A hopper 26 is inserted in the upper cup-shaped portion 14a of the closing element 14. The hopper conveys ingredients towards the inlet 12.

The closing element 14 is free to rotate about its central axis B relative to the hopper 26 which in contrast remains substantially fixed relative to axis B. On the top of the hopper 26 there is a lid 27, hinged to the hopper 26, which is operated by an articulated arm 28, fixed coaxially on the element 14.

As illustrated in FIG. 3, the removable head 10 is hinged on the machine 1 frame 3 by a hinge 29 and has a respective clamping element 33 able to guarantee sealed closing of the whipping and freezing unit 2 chamber 8.

The closing element 14, with its first and second separators 16, 17 forms, for the machine 1, respective means 30 for closing the inlet 12 and the outlet 13 to and from the whipping and freezing unit 2.

The machine 1 also comprises means 31 for feeding pressurized air into the whipping and freezing unit 2.

As is schematically illustrated in FIG. 3, the means 31 comprise a pipe 32 made on the head 10 and designed to put the refrigerated chamber 8 of the whipping and freezing unit 2 into communication with a pressurized air feed circuit, not illustrated, to facilitate the exit of the ice cream shop product prepared from the whipping and freezing unit 2.

The closing element 14 is designed to rotate about its own central axis B to move at least between a first predetermined position, illustrated in FIG. 2, in which the inlet 12 is open and at the same time the outlet 13 is closed, and a second predetermined position in which the inlet 12 is closed and at the same time the outlet 13 is open.

In practice, with reference to FIG. 2, with the closing element 14 in its first predetermined position, ingredients are introduced into the whipping and freezing unit 2.

The ingredients, not illustrated, slide through the hopper 26 due to gravity and into the refrigerated chamber 8, going through the inlet 12.

In detail, with the element 14 in its first predetermined position, the first opening 19 made in the upper cylindrical wall 18 is opposite the inlet 12, creating a connection between the hopper 26 and the chamber 8 of the whipping and freezing unit 2, whilst in contrast the second separator 17 obstructs the outlet 13, preventing the ingredients from exiting the chamber 8.

With the closing element 14 in its first predetermined position, the above-mentioned partly illustrated motor-driven mixer 9 is activated, which, thanks to its blades, not illustrated, and the low temperature, allows whipping and freezing of the ice cream shop product.

During the whipping and freezing step, the inlet 12 remains open so that additional ingredients can be introduced, for example solid bodies such as cereals, fresh fruit or dried fruit and the like, even at advanced stages of the processing.

Advantageously, in this way, the solid bodies are prevented from deteriorating due to direct contact with the mixer blades. The introduction of the solid bodies when the product is already partly whipped and frozen allows the impacts between the blades and the solid bodies to be greatly cushioned.

When, after a predetermined time, the ice cream shop product is substantially ready, using the control handle not illustrated, the closing element 14 is rotated approximately 90° about its central axis B to adopt its second predetermined position, not illustrated in the accompanying drawings.

In the second predetermined position, not illustrated, the second opening 21 made in the lower cylindrical wall 20 of the closing element 14 is opposite the outlet 13, creating a connection between the chamber 8 of the whipping and freezing unit 2 and the outside, whilst in contrast the first separator 16 obstructs the inlet 12.

In this configuration, the pressurized air feed means 31 are activated, which, substantially putting the chamber 8 in overpressure, contribute to pushing the ice cream shop product prepared so that it exits the chamber 8, through the outlet 13, which is the only way to the outside.

Advantageously, thanks to the help of the overpressure in the chamber 8 during the step of dispensing the ice cream shop product prepared, the product can easily exit the chamber 8 even if it contains solid bodies having considerable dimensions.

In the case of traditional artisan ice cream shop machines, the pressurization described and supplied by the air feed means 31 is absent. These machines have a structure identical to that described above with reference to the machine illustrated in FIG. 1.

Figure 5:
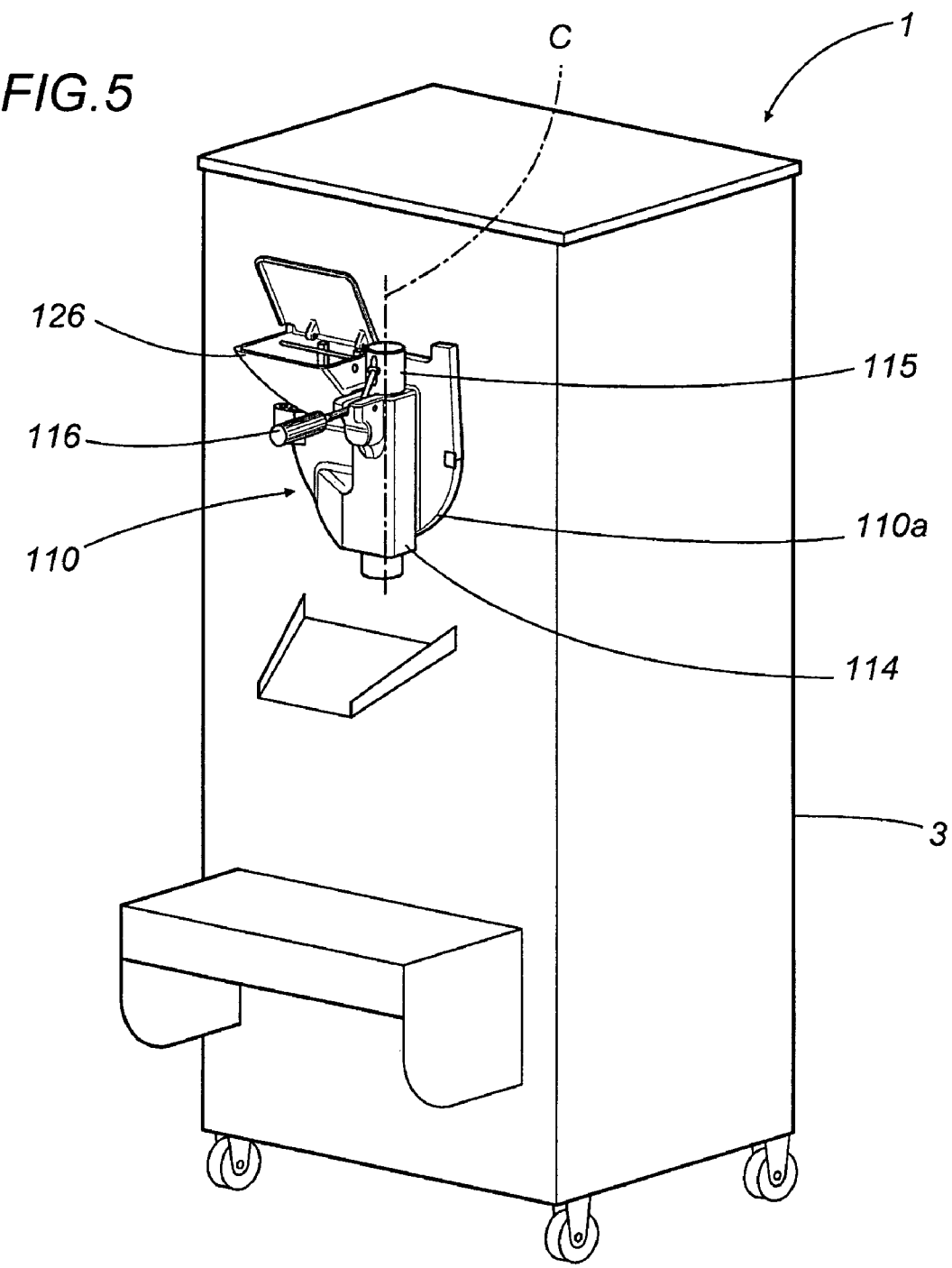
FIG. 5 is a front perspective view of a machine for producing and dispensing ice cream shop products, comprising a door realized according to a first embodiment.
Figure 9A:
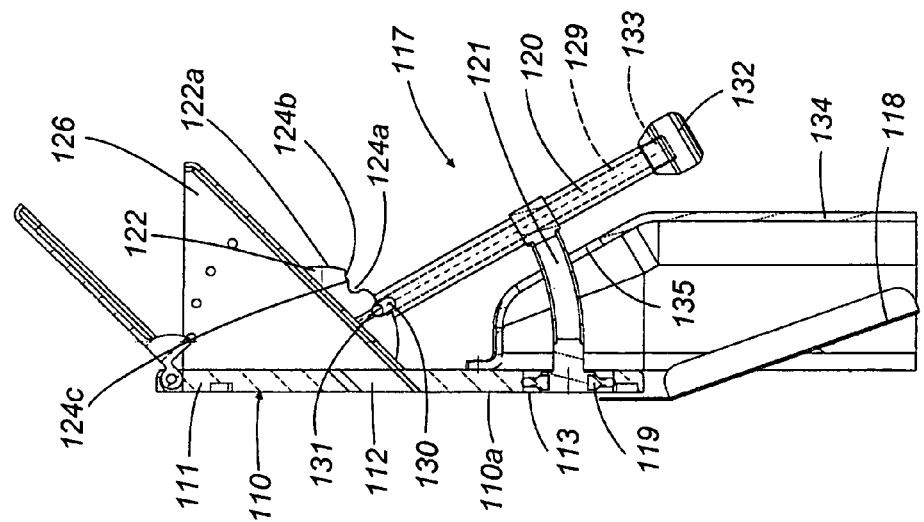
FIG. 9a is a side view in cross-section of a second embodiment of a door for a machine for producing and dispensing ice cream.
Figure 10:
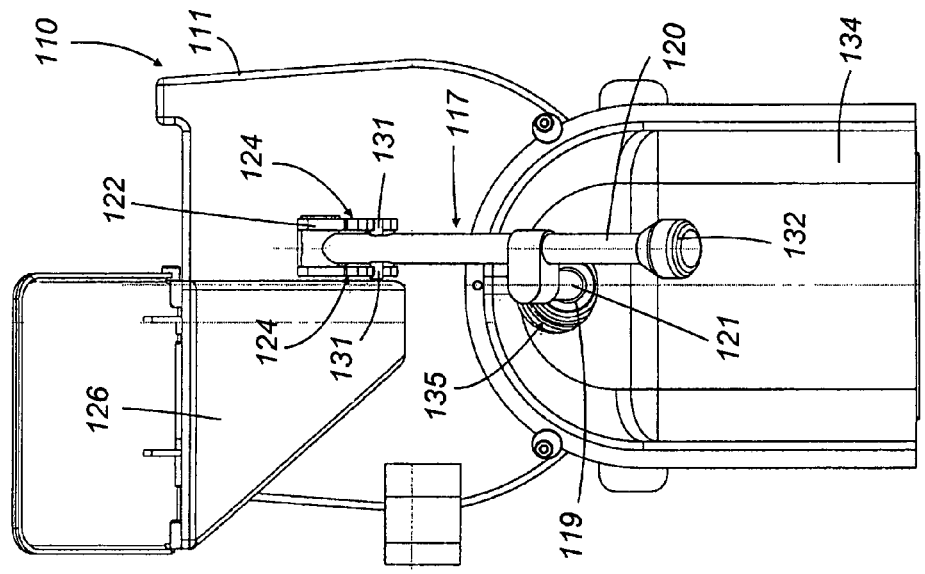
Figure 11:
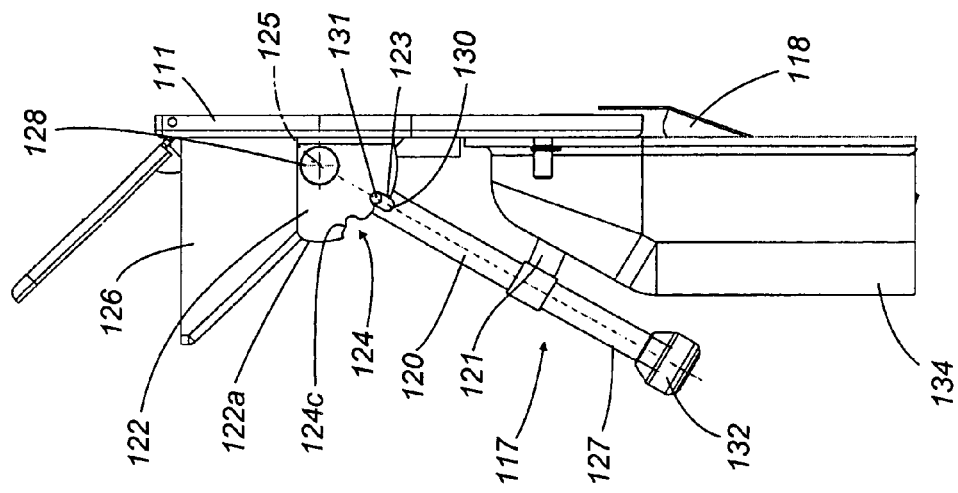

With reference to the machine illustrated in FIGS. 5 and 9, at the end 8a of the horizontal whipping and freezing unit 2 chamber 8, the machine 1 comprises a removable head 110 which, with its flat portion 110a opposite the inside of the chamber 8, forms an end wall 111 of the refrigerated chamber 8 and therefore of the whipping and freezing unit 2.

In the end wall 111 formed by the portion 110a there is an inlet 112 for the ingredients to be inserted in the whipping and freezing unit 2 and intended to constitute the ice cream shop product, and an outlet 113 for the ice cream shop product prepared.

Figure 6:
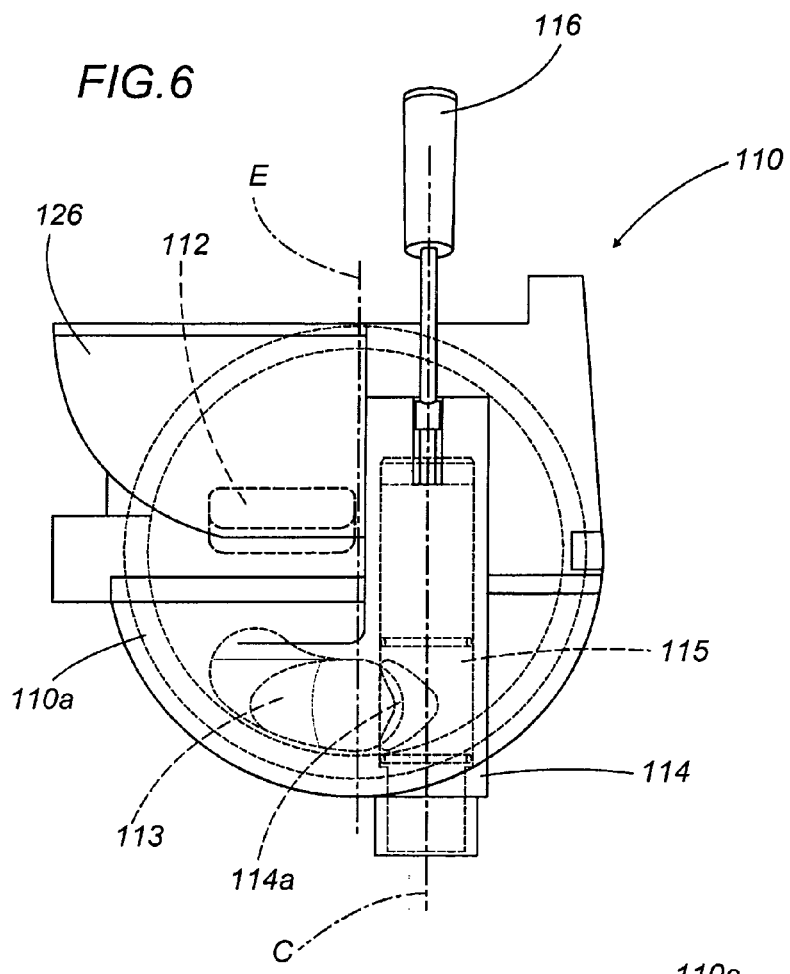
FIG. 6 is a front view of a first embodiment of a door for a machine for producing and dispensing ice cream.
Figure 7:
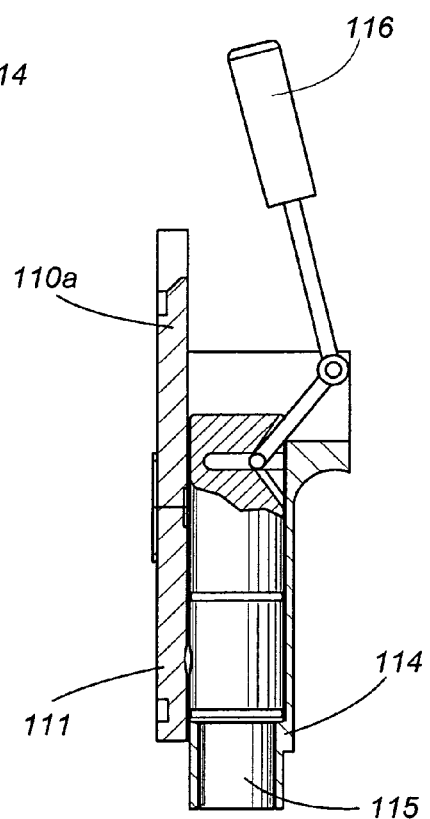
FIG. 7 is a side view in cross-section of the door of FIG. 6.

The inlet 112 and the outlet 113 are separate from each other and are positioned at different heights above the ground: the inlet 112 is in the higher position and the outlet 113 is in the lower position. On the flat portion 110a, in a position projecting outside the machine 1, the removable head 110 has a hopper 126 for conveying the ingredients in communication with the inlet 112 of the whipping and freezing chamber 8. FIGS. 5 and 6 show how the hopper 126 is positioned at the side of a vertical axis E of the flat portion 110a. Next to the hopper 126, positioned on the opposite side of the axis E, the head 110 has a cylindrical tubular dispenser 114 with a vertical axis C, which is open at the bottom. The dispenser 114 is in fluid communication with the whipping and freezing chamber 8, by means of a first opening 114a, located at the outlet 113 and made along the longitudinal extension of the dispenser 114. The dispenser 114 comprises, inside it, a piston 115 which slides vertically when operated by a set of lever mechanisms forming a control handle 116.

The piston 115 alternately opens and closes the outlet 113, respectively allowing and preventing product outfeed, depending on the position of the control handle 116, which is established by the user. The dispenser 114 can dose the product according to the quantity of ice cream required.

An alternative embodiment to that described with reference to FIGS. 5 to 9 is shown in FIGS. 9a to 11 and described below.

In particular, the solution differs from the previous one substantially in the shape of the dispenser 117 which, in this case, comprises a shutter 119 consisting of a disk, preferably made of plastic or rubber, whose diameter is equal to the diameter of the outlet 113 section. The shutter 119, in the non-operating position, completely closes the product outlet 113, made in the portion 110a of the wall 111.

The dispenser 117 also comprises a control lever 120 connected to the shutter 119 by an arm 121 with a curved axis.

The control lever 120 is hinged at a pin 128 to a supporting element 122 secured to the wall 111 and rotates about a horizontal axis 125, parallel with the wall 111. The supporting element 122 is a plate with a curved outer edge 122a on which there are, spaced out in sequence, a first notch 123 and a second notch 124. The first notch 123 is semicircular, whilst the second notch 124 in turn comprises two recesses 124a and 124b, side by side and separated by a projection 124c.

The control lever 120 comprises an outer tubular element 127 hinged at one end to the pin 128, able to rotate about the horizontal axis 125, and at its second end supporting a knob 132. An inner tubular element 129 is mounted coaxially to the outer tubular element 127 and in such a way that it is capable of axial travel relative to the latter. The outer tubular element 127 has a pair of oblong slits 130, diametrically opposed and positioned close to the outer edge 122a of the plate 122. The inner tubular element 129 in turn has, at the slits 130, a pair of pins 131, projecting outside the slits 130 and able to slide in them. The pins are designed to engage in the notches 123 and 124. A helical spring 133 is interposed between the bottom of the knob 132 and the second end of the outer tubular element 127. In the non-operating position, illustrated in FIG. 9a, the lever 120 is in the lowered position, the shutter 119 completely closes the outlet 113 and the pins 131 are housed in the first notch 123.

When the product is to be discharged, the operator grips the knob 132 on the lever 120 and pulls so that the inner tubular element 129 slides axially relative to the outer tubular element 127. This action moves the pins 131 which disengage from the first notch 123, allowing the lever 120 to rotate about the axis 125.

Lever 120 rotation continues until the pins 131 engage in the second notch 124. In particular, the pins 131 are inserted in the first recess 124a of the second notch 124. In this dispensing configuration, the lever 120 is locked and the shutter 119 is distant from the outlet 113, thus allowing product dispensing.

Below the outlet 113 there is a chute 118 onto which the product drops and flows, in this way being conveyed into suitable tubs prepared in the appropriate fashion.

The chute 118, the outlet 113, the shutter 119 and part of the arm 121 are at least partly hidden from the user's view by a panel 134 located in front of the wall 111 and open at the bottom. The panel 118 also has an upper opening 135 for the passage of the arm 121.

To completely extract the arm 121 from the panel 118 through the opening 135, a pulling action again has to be applied on the knob 132 and the upward rotation of the lever must be continued, so that the pins 131 disengage from the first recess 124a of the second notch 124, passing over the projection 124c until they engage in the second recess 124b of the second notch 124.

Vice versa, to reposition the lever 120 in the non-operating configuration the knob 132 must be pulled again and the lever lowered until the pins 131 engage in the first notch 123.

In both of the configurations described, with reference to FIGS. 5 to 9 and 9a to 11, the head 110 as a whole forms a door equipped with a dispenser and a hopper, which can be connected to a traditional artisan ice cream shop machine. Unlike the traditional doors fitted on traditional machines for the production of artisan ice cream shop products, the head 110 does not have the classic outlet with a grille and which is visible from the outside, from which the whipping and freezing chamber 8 is completely emptied to pour the finished product directly into the counter display tub.

The invention achieves the preset aims.

With reference to the machine illustrated in FIGS. 1 to 4, it is obvious that the fact that the planes of symmetry of the openings 19, 21 are offset by 90° from each other is not in any way limiting, since similar results can be achieved even with different angles.

Moreover, both with the door, or head, connected to the pressurized machine, and with the door connected to the traditional non-pressurized machine, it is possible to have available artisan ice cream at any time during the whipping and freezing process, dispensing even small portions of product.

Rotation of the mixer 9, and therefore of the blades in the whipping and freezing chamber 8 mixes in the known way the ingredients introduced into the whipping and freezing unit 126 and pushes the creamy mass of ice cream shop product being formed towards the end 8a of the whipping and freezing unit 2 chamber 8, until the cavity of the dispenser 114 or the curved duct 118 is filled. Operating the control handle 116 or the control lever 120, allows the dosing of the desired quantity of ice cream shop product.

In the configuration illustrated in FIGS. 5 to 9, the outlet 113 communicates with the outside through the dispenser 114 which, being a piston doser, allows the user to dispense small doses, or even only a single dose of ice cream, directly into cups or onto cornets that people can walk around with.

However, that does not rule out the possibility of also being able to fill counter display containers through the same dispenser 114.

With reference to the embodiment illustrated in FIGS. 9a to 11, the door equipped with a dispenser with a curved axis comprises a safety device which locks the lever both in the non-operating position, and in the dispensing position, and also prevents accidental disengagement of the dispenser from its seat, thanks to the double movement needed to completely draw out the curved arm and therefore the shutter from the covering panel. The invention described above is susceptible of industrial application and may be modified and adapted in several ways without thereby departing from the scope of the inventive concept. Moreover, all details of the invention may be substituted by technically equivalent elements.

What is claimed is:

1. A machine for preparing and dispensing an ice cream shop product comprising:
   a whipping and freezing unit with a horizontal axis (A), said whipping and freezing unit having at least one inlet for ingredients intended to constitute the ice cream shop product and one outlet for the ice cream shop product prepared, said inlet and outlet being separate from each other;
   a mechanism for closing the inlet and a mechanism for closing the outlet, wherein the mechanism for closing the inlet and the mechanism for closing the outlet are integrated in a single closing element;
   wherein the closing element comprises a first separator for closing the inlet and a second separator for closing the outlet, said separators being positioned in such a way as to guarantee, at least with the closing element in a first predetermined position, closing of the inlet and simultaneous opening of the outlet.

2. The machine according to claim 1, and further comprising a pressurized air feed mechanism for introducing pressurized air into the whipping and freezing unit, at least when the closing element is in its first predetermined position, to facilitate dispensing of the ice cream shop product prepared from the whipping and freezing unit.

3. The machine according to claim 1, wherein the first and second separators are positioned in such a way as to guarantee, at least with the closing element in a second predetermined position, closing of the outlet and simultaneous opening of the inlet.

4. The machine according to claim 3, wherein the closing element is rotatable about its own central axis (B) to move at least between said first and second predetermined positions.

5. The machine according to claim 4, wherein the first separator comprises an upper cylindrical wall having a first opening and the second separator comprises a lower cylindrical wall having a second opening.

6. The machine according to claim 5, wherein the first and second openings each have a plane of symmetry partially defined by the central axis (B) of rotation, said planes of symmetry being offset from each other by an angle of 90 sexagesimal degrees.

7. The machine according to claim 1, and further comprising a removable head, said head having a substantially flat portion forming an end wall of the whipping and freezing unit.

8. The machine according to claim 7, wherein the removable head incorporates the whipping and freezing unit inlet and outlet.

9. The machine according to claim 7, wherein the closing element is supported by the removable head.

10. A machine for preparing and dispensing an ice cream shop product comprising:
    a whipping and freezing unit with a horizontal axis (A), said whipping and freezing unit having at least one inlet for ingredients intended to constitute the ice cream shop product and one outlet for the ice cream shop product prepared, said inlet and outlet being separate from each other;
    a door equipped with a hopper for introducing ingredients into the whipping and freezing unit and a dispenser with a vertical axis (C) for dispensing small doses of product, the dispenser comprising an internal piston which slides vertically for dosing the product, a control handle for operating the piston and a plurality of levers connecting the piston and the control handle.

11. The machine according to claim 10, wherein the dispenser is in fluid communication with the whipping and freezing unit through the outlet.

12. The machine according to claim 10, wherein the hopper is in fluid communication with the whipping and freezing unit through the inlet.

13. The machine according to claim 10, wherein the hopper and the dispenser are positioned on opposite sides of a vertical axis (E) of the door.

14. A machine for preparing and dispensing an ice cream shop product comprising:
    a whipping and freezing unit with a horizontal axis (A), said whipping and freezing unit having at least one inlet for ingredients intended to constitute the ice cream shop product and one outlet for the ice cream shop product prepared, said inlet and outlet being separate from each other,
    a door equipped with a hopper for introducing ingredients into the whipping and freezing unit and a dispenser engaged in a seat, said dispenser comprising a safety device for locking the dispenser in a desired position and preventing accidental disengagement of the dispenser from its seat;
    wherein the dispenser comprises a shutter which closes the outlet;
    wherein the dispenser comprises a control lever, connected to the shutter by an arm with a curved axis and hinged at one end to a pin.

15. The machine according to claim 14, wherein the safety device comprises a plate which connects the lever to the wall, the plate also having a curved outer edge having at least a first notch and a second notch.

16. The machine according to claim 15, wherein the control lever comprises an outer tubular element and an inner tubular element coaxial with and axially slidable in said outer tubular element; said inner tubular element being moved by an outer knob located at one end of the outer tubular element and connected to the inner tubular element by a spring.

17. The machine according to claim 16, wherein the outer tubular element has a pair of slits which are diametrically opposed, the inner tubular element has a pair of pins projecting from the slits and slidable in the slits; said pins engaging in the first notch to lock the control lever in a non-operating position and keep the shutter against the outlet to close the outlet, and engaging in the second notch to lock the lever in a dispensing operating configuration, in which the shutter is distanced from the outlet and the product is dispensed.

* * * * *